F. H. PAGE.
WING AND SIMILAR MEMBER OF AIRCRAFT.
APPLICATION FILED JAN. 4, 1922.
1,427,012.
Patented Aug. 22, 1922.
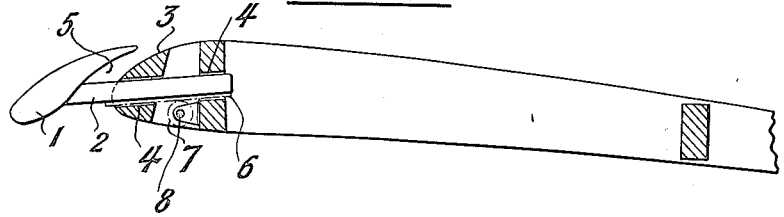
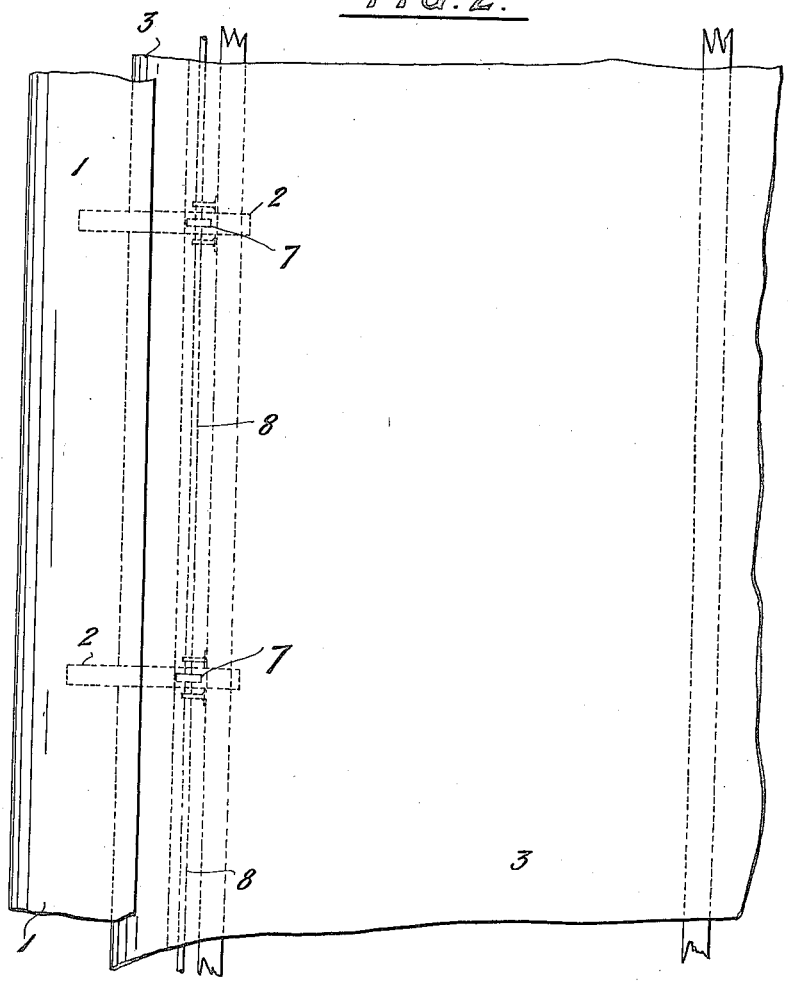

UNITED STATES PATENT OFFICE.

FREDERICK HANDLEY PAGE, OF LONDON, ENGLAND, ASSIGNOR TO HANDLEY PAGE LIMITED, OF LONDON, ENGLAND.

WING AND SIMILAR MEMBER OF AIRCRAFT.

1,427,012.                    Specification of Letters Patent.    Patented Aug. 22, 1922.

Application filed January 4, 1922. Serial No. 526,888.

*To all whom it may concern:*

Be it known that I, FREDERICK HANDLEY PAGE, a subject of the King of Great Britain, residing at London, England, have invented certain new and useful Improvements in the Wings and Similar Members of Aircraft, of which the following is a specification.

In the specification of Patent No. 1353666, 21st September 1920, wings for aeroplane flying machines have been described, which wings are composed of two or more parts consisting of a wing-section main wing and a forwardly-located part or parts termed auxiliary wings, which latter are also of wing-section and are connected or formed with the main wing, but so that open slots extending substantially through the wing in a direction transversely of the direction of flight exist between either the auxiliary wings, or between an auxiliary wing and the main wing; in some instances the auxiliary wings are pivoted or otherwise adjustable relatively to each other and to the main wing so as to close said slots when required. In the example described in the prior specification, links pivoted on the main wing pivotally carry an auxiliary wing on their ends and by a parallel motion of the said links the auxiliary and main wings can be adjusted in distance in parallel manner, relatively to each other, to open or close the slot or slots.

In the specification of my patent application Serial No. 464896 filed April 27th, 1921, I have described improved means whereby the auxiliary wings are slidably carried upon guide members extending from the edge of the main wing, whereby the auxiliary wings can be adjusted by a rectilinear parallel motion to or from the edges of the main wing parallel to the chord thereof, or where said guide members have a downward direction the auxiliary wings are displaced downwards relatively to the main wing as the slot is opened.

Now according to the present invention each wing structure comprises a wing-section main wing and a wing-section auxiliary wing extending adjacent the edge of the main wing and in a direction transversely of the line of flight, the auxiliary wing having a plurality of supporting arms fixed to and extending from it, and the main wing has guide ways to receive said supporting arms and within which guide ways said supporting arms can slide, and means are provided for communicating sliding movements of adjustment to said auxiliary wing to and from the edge of said main wing and parallel therewith to close or open a slot between said auxiliary wing and said main wing.

The guide ways in the main wing may extend either parallel to the chord of the main wing or at any desired downward angle thereto, and when constructed with a downward inclination the auxiliary wing will be displaced downwards relatively to the main wing as the slot is opened and increases the effective camber of the structure.

It will be obvious that such an auxiliary wing may be located in the front or at the rear of the main wing.

The invention will be further described with reference to the accompanying drawings.

Fig. 1 is a part sectional elevation, and Fig. 2 a part plan view.

Referring to Figs. 1 and 2 of the drawings, the auxiliary wing 1 has fixed thereto a plurality of supporting arms 2 extending in the direction of the main wing 3, which arms 2 extend through guideways 4 formed in the structure of the main wing 3, so that the auxiliary wing 1 can be slid to or away from the adjacent edge of the main wing 3 to wholly or partially close or open the slot 5.

The drawings show an example where, as the auxiliary wing 1 is slid away from the adjacent edge of the main wing 3 to open the slot 5, the said auxiliary wing is displaced downwards owing to the supporting arms 2 being set at an angle, and thereby, when the auxiliary wing is slid away from the adjacent edge of the main wing to open the slot, it is displaced in a downward direction relatively to the chord of the main wing and thereby increases the effective camber of the wing structure.

Suitable means are provided for effecting the adjustments of position of the auxiliary wing 1, relatively to the main wing 3, and an example of such means is sufficiently shown in the drawings where two or more of the supporting arms 2, are formed with toothed racks 6 gearing with pinions 7 mounted on a shaft 8 carried by the structure of the main wing 3, and flexible connections, as will be readily understood, can extend from say a pulley on the shaft 8 to an operating device, such as a ratchet-governed drum within reach of the aviator, by the operation of which the shaft can be revolved and the auxiliary wing adjusted to and away from the main wing as required.

What I claim as my invention and desire to secure by Letters Patent is:—

1. In aeroplane flying machines; wing structures each comprising a wing-section main wing and a wing-section auxiliary wing extending adjacent the edge of said main wing and in a direction transversely of the line of flight, a plurality of supporting arms fixed to said auxiliary wing and extending therefrom, said main wing having guideways to receive said supporting arms and within which guideways said supporting arms can slide, and means for communicating sliding movements of adjustment to said auxiliary wing to and from the edge of said main wing and parallel therewith to close or open a slot between said auxiliary wing and said main wing.

2. In aeroplane flying machines; wing structures each comprising a wing-section main wing and a wing-section auxiliary wing extending adjacent the edge of said main wing and in a direction transversely of the line of flight, a plurality of supporting arms fixed to said auxiliary wing and extending therefrom, said main wing having guideways constructed at a downward angle relatively to the chord of said main wing to receive said supporting arms and within which guideways said supporting arms can slide, and means for communicating sliding movements of adjustment to said auxiliary wing to and from the edge of said main wing and parallel therewith to close or open a slot between said auxiliary wing and said main wing.

3. In aeroplane flying machines; wing structures each comprising a wing-section main wing, a small forwardly-located auxiliary wing extending adjacent the forward edge of said main wing and in a direction transversely of the line of flight, a plurality of supporting arms fixed to said auxiliary wing and extending rearwardly therefrom and at an angle to the chord of the main wing, said main wing having guideways constructed at a downward angle relatively to the chord of said main wing to receive said supporting arms and within which guideways said supporting arms can slide, and means for communicating sliding motions of adjustment to said auxiliary wing to and from the edge of the main wing and parallel therewith to close or open a slot between said auxiliary wing and said main wing and also whereby when said auxiliary wing is distanced from the forward edge of said main wing said auxiliary wing is displaced in a downward direction relatively to the chord of the main wing to increase the effective camber of the wing structure.

In witness whereof I have hereunto set my hand in the presence of two witnesses.

FREDERICK HANDLEY PAGE.

Witnesses:
THOMAS WILLIAM ROGERS.
WILLIAM A. MARSHALL.